US006637200B2

(12) United States Patent
Barba et al.

(10) Patent No.: US 6,637,200 B2
(45) Date of Patent: Oct. 28, 2003

(54) MEMBRANE-ACTIVATED HYDRAULIC ACTUATOR

(75) Inventors: Valentin Barba, Scotrun, PA (US); Khoi T. Vu, Randolph, NJ (US)

(73) Assignee: Smiths Industries Aerospace Actuation Systems, Inc., Whippany, NJ (US)

( * ) Notice: Subject to any disclaimer, the term of this patent is extended or adjusted under 35 U.S.C. 154(b) by 176 days.

(21) Appl. No.: 10/033,093

(22) Filed: Oct. 19, 2001

(65) Prior Publication Data

US 2003/0136122 A1 Jul. 24, 2003

(51) Int. Cl.[7] .................................................. F16D 31/02

(52) U.S. Cl. ......................... 60/473; 60/486; 417/413.2; 417/521

(58) Field of Search .......................... 60/473, 486, 468, 60/492; 417/413.2, 521

(56) References Cited

U.S. PATENT DOCUMENTS 4,113,054 A * 9/1978 Myers ......................... 60/486

* cited by examiner

*Primary Examiner*—Edward K. Look
*Assistant Examiner*—Michael Leslie
(74) *Attorney, Agent, or Firm*—Fish & Neave; Joel Weiss; Scott Kaliko

(57) ABSTRACT

A hydraulic actuator that is capable of substantial actuation but does not require a conventional pump, uses only deflectable membranes and passive valves, or, at most, a minimum of active valves, and, under certain circumstances, may be free to move when the actuator is de-energized, is provided. The actuator utilizes the deflectable membranes to move fluid throughout the actuator. The movement of the fluid actuates a shaft or other suitable device, as required.

17 Claims, 11 Drawing Sheets

MEMBRANE-ACTIVATED HYDRAULIC ACTUATOR

BACKGROUND OF THE INVENTION

This invention relates to actuators. More particularly this invention relates to small hydraulic actuators.

In conventional hydraulic actuators, conventional pumps and active valves are required to guide the fluid in and out of actuator chambers in order to move actuator shafts. Typically, the pumps are heavy and require high levels of maintenance. The valves require constant manipulation, and also require substantial maintenance.

It would be desirable to provide a hydraulic actuator that is capable of substantial actuation but does not require a conventional pump.

It would also be desirable to provide a hydraulic actuator that is capable of substantial actuation but uses only passive valves, or, only a minimum of active valves.

It would also be desirable to provide a hydraulic actuator that provides the above advantages, yet allows the shaft attached to the actuator freedom of movement when power is unavailable to the actuator.

SUMMARY OF THE INVENTION

It is an object of this invention to provide a hydraulic actuator that is capable of substantial actuation but does not require a conventional pump.

It is also an object of this invention to provide a hydraulic actuator that is capable of substantial actuation but uses only passive valves, or only a minimum of active valves.

It is also an object of this invention to provide a hydraulic actuator that provides the above advantages, yet allows the shaft attached to the actuator freedom of movement when power is unavailable to the actuator.

A hydraulic actuator for actuating a shaft is provided. The actuator includes a first chamber and a second chamber adjacent to the first chamber. Fluid is passed between the chambers using a number of tubes. A divider portion of the shaft is disposed between the two chambers. The divider portion seals the first chamber from the second chamber such that when fluid flows from either chamber to the other, the shaft is actuated. The actuator also includes a plurality of deflectable membranes for causing the fluid to flow and a plurality of passive valves for directing a flow of fluid in the actuator.

A method according to the invention includes actuating a shaft using a hydraulic actuator. The method includes pre-positioning a first plurality of membranes in the actuator. Then, the method includes deflecting a second plurality of deflectable membranes in order to move fluid in the actuator such that movement of the fluid causes the shaft to move. And, when the membranes are in a non-deflectable state, allowing the shaft to respond to an external force.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout.

DETAILED DESCRIPTION OF THE INVENTION

Figure 1:
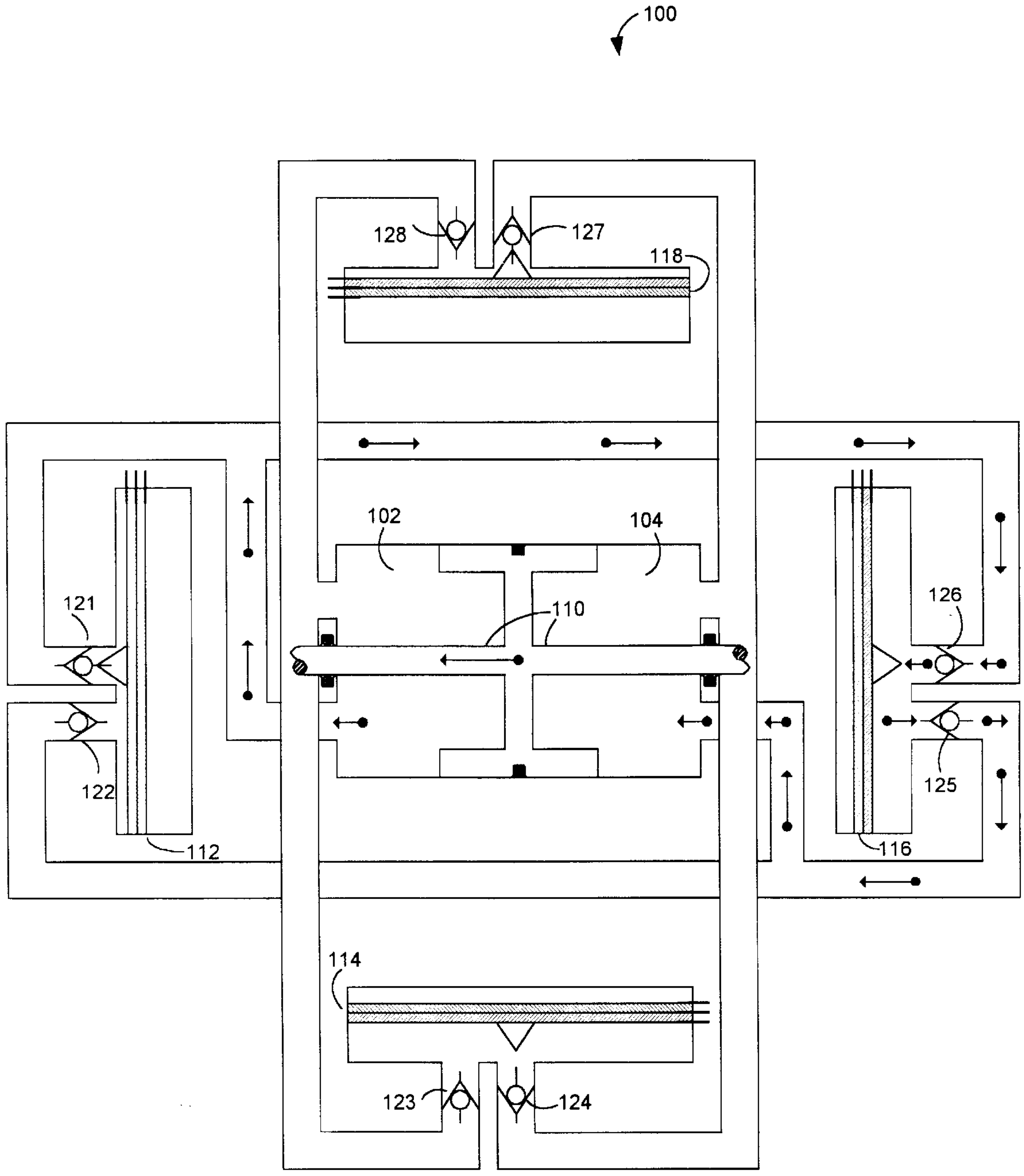
FIG. 1 is a schematic diagram of a preferred embodiment of a de-energized hydraulic actuator according to the invention responding to a right-to-left external force.

FIG. 1 shows a side view of a schematic diagram of a preferred embodiment of a de-energized free hydraulic actuator system 100 according to the principles of the invention. Actuator 100 preferably includes variable chambers 102, 104, shaft 110 (which includes a movable divider which divides between chambers 102 and 104 that varies the size of each of the chambers when moved in either-a right-to-left or a left-to-right motion), deflectable membranes 112, 114, 116, 118, (each membrane preferably includes an obturator for blocking a particular tube as required, as shown by the triangle attached to each membrane) passive check valves (or other suitable unidirectional valves) 121–128 (these valves only allow fluid to pass in one direction, opposite the direction of the vertex of the angle which, together with the sphere, represents the valve) and a series of tubes for transmitting fluid throughout the system.

It should be noted that the divider portion of the shaft may be a simple piston in a cylinder, a rotary vane divider in a hydraulic vane motor, a diaphragm in a hydraulic cylinder, a pair of gears in a hydraulic motor, or any other suitable device that translates displacement of fluid into an output motion.

One function of actuator 100 is to actively move shaft 110. Actuator 100 can preferably move shaft 110 in either a right-to-left motion or in a left-to-right motion by deflecting selected membranes. Another preferable function of actuator 100 is to allow shaft 110 to move freely when actuator 100 fails or when power is otherwise unavailable—e.g., when it is not able to actuate shaft 110 or when it has been turned off. This is known as the de-energized free feature of an actuator according to the invention.

The de-energized free function of actuator 100 requires that, when the actuator has failed or power is otherwise unavailable such that none of the membranes are deflected, shaft 110 is free to move in response to external forces. FIG. 1 illustrates the condition of actuator 100 when it operates in a de-energized condition—i.e., none of the membranes are deflected—and a right-to-left external force is being applied to shaft 110.

When a right-to-left external force is applied to shaft 110, the divider portion of shaft 110 substantially instantaneously exerts an increased pressure on the fluid in chamber 102 and substantially Instantaneously reduces the pressure on the fluid in chamber 104. The increased pressure in chamber 102 causes the fluid in chamber 102 to seek a path of exit from chamber 102. The tubes from chamber 102 are connected to valves 121, 123, 126 and 128. However, valves 123 and 128 do not allow fluid to pass in the direction required for fluid exiting chamber 102.

Therefore, only valves 121 and 126 can pass fluid from chamber 102. The path through valve 121, however, is blocked by the obturator of membrane 112. Thus, the only possible path for fluid exiting from chamber 102 is through valve 126.

In addition to causing fluid to leave chamber 102, the right-to-left external force applied to shaft 110 also reduces the pressure on the fluid in chamber 104, thereby causing additional fluid to be delivered to chamber 104 in order to counteract the reduction in pressure. Fluid paths to chamber 104 exist from valves 122, 124, 125 and 127. However, valves 124 and 127 do not allow fluid to pass in the direction required for fluid entering chamber 104.

Therefore, only valves 122 and 125 can provide fluid to chamber 104. The path through valve 122, however, is blocked by the obturator of membrane 112, which does not allow any additional fluid to enter through valve 121, thereby effectively stopping fluid flow through valve 122. Thus, the only possible path for providing fluid to chamber 104 is through valve 125.

Thus, shaft 110 can move in a right-to-left direction when actuator 100 is in a de-energized state and when an external force is applied to shaft 110 which causes right-to-left movement because the fluid flows from chamber 102 into valve 126 and from valve 125 into chamber 104, as indicated by the arrows shown in FIG. 1. This arrangement preserves the fluid equilibrium of actuator 100 while allowing shaft 110 to move in response to an external right-to-left force.

Figure 2:
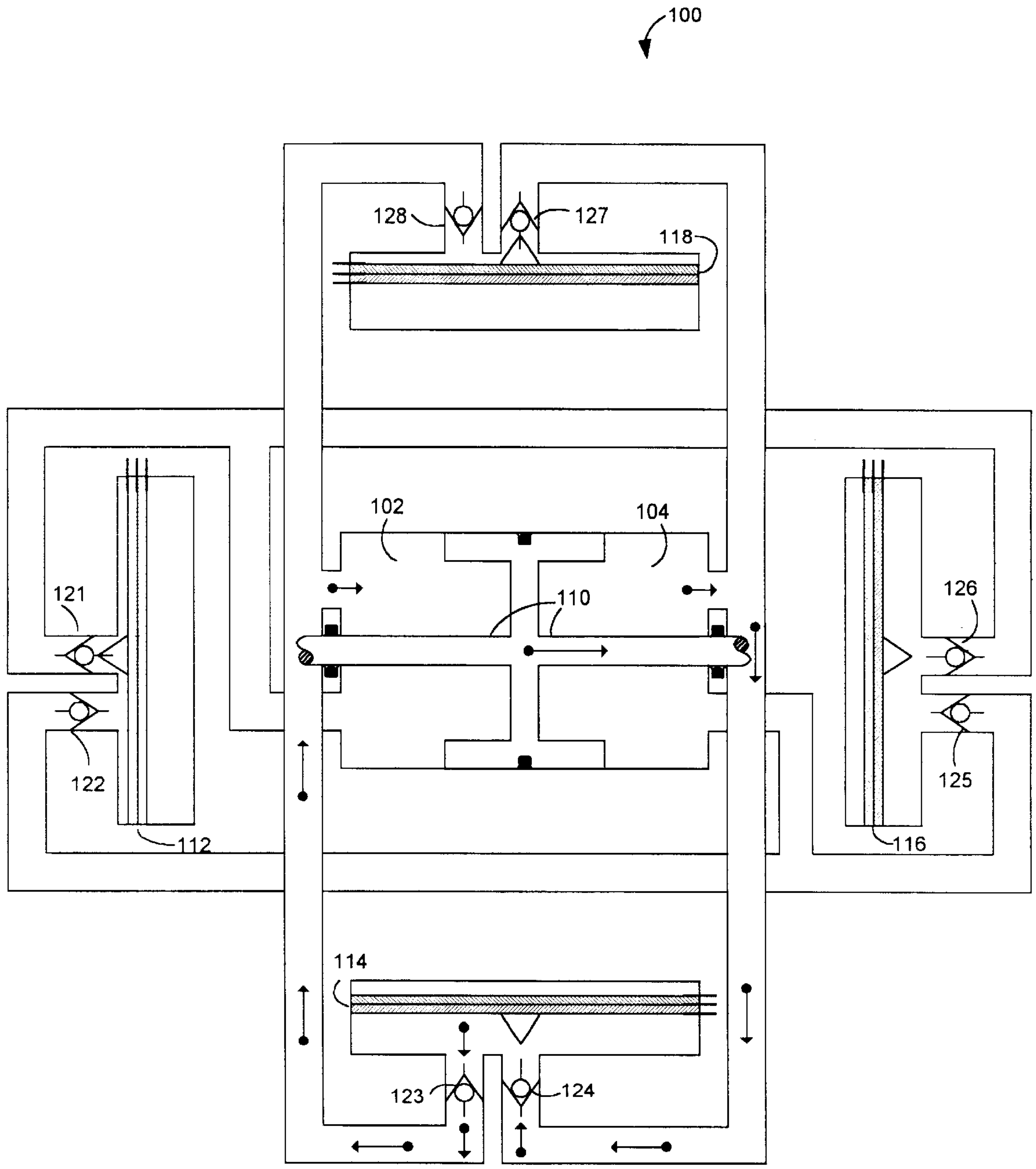
FIG. 2 is a schematic diagram of the actuator in FIG. 1 responding to a left-to-right external force.

FIG. 2 illustrates the condition of actuator 100 when it operates in a de-energized free condition and a left-to-right external force is applied to shaft 110. In this situation, fluid flows from chamber 104 through valve 124 and from valve 123 into chamber 102, as shown by the arrows in FIG. 2. The analysis of the fluid movement which causes this condition is along the same lines as the analysis of the fluid movement described in detail above with respect to right-to-left movement indicated FIG. 1.

Figure 3:
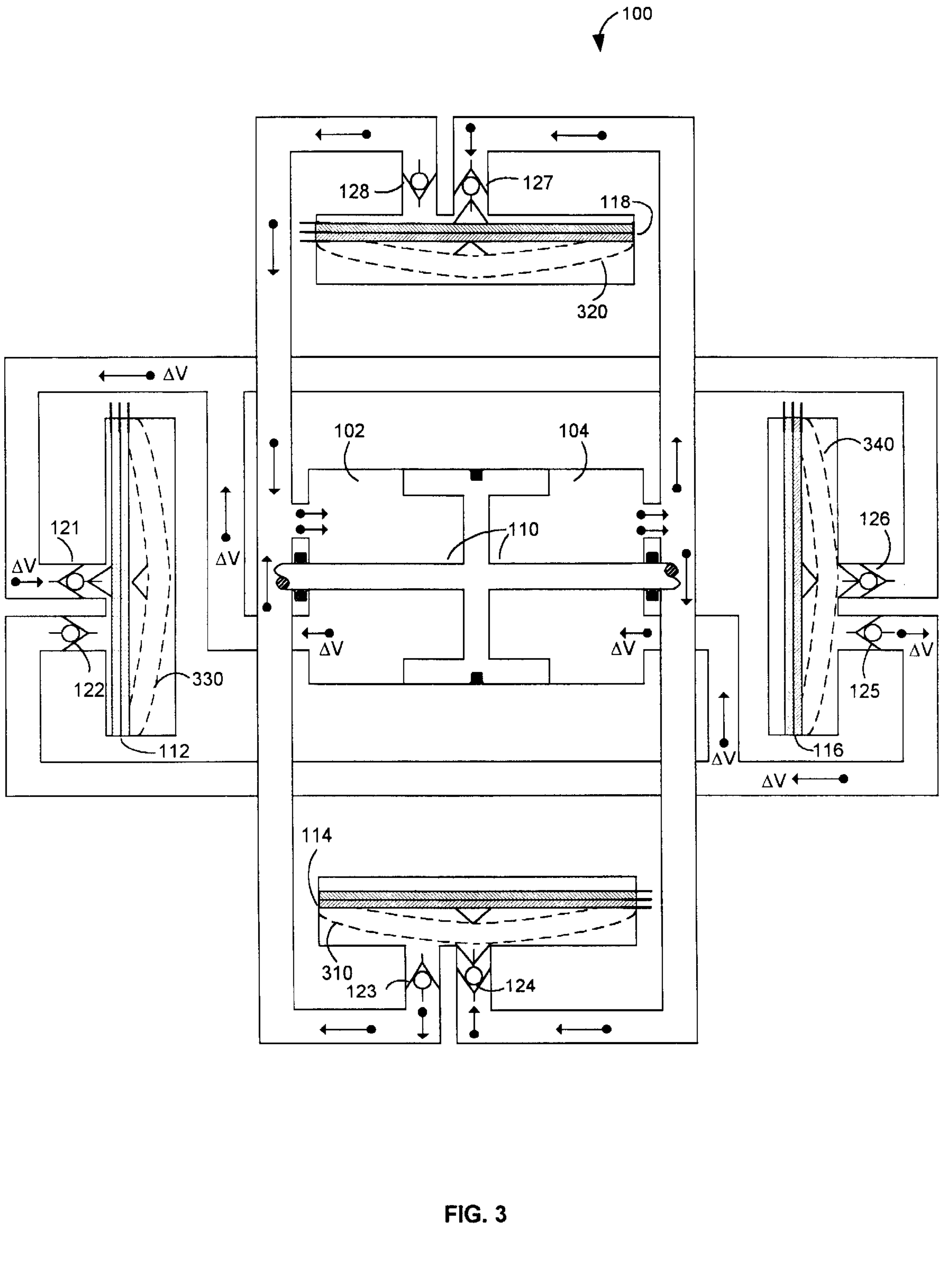
FIG. 3 is a schematic diagram of the actuator in FIGS. 1 and 2 causing a left-to-right actuator shaft movement.

FIG. 3 illustrates the operation of actuator 100 when the membranes are deflected to produce a left-to-right movement of shaft 110.

Left-to-right movement of shaft 110 requires addition of fluid to chamber 102 and removal of fluid from chamber 104 (the combination of the two that causes the divider portion of shaft 110 to be moved in a left-to-right movement). One preferable way to cause this movement is by substantially simultaneously deflecting membranes 114 and 118 in-phase with one another—i.e., substantially simultaneously—to positions 310 and 320, respectively, in a substantially pulse-like fashion. Each deflection causes fluid to flow into chamber 102 and out of chamber 104, as will be explained.

However, before the deflections of membranes 114 and 118 can be implemented to actuate shaft 110, membranes 112 and 116 must be pre-positioned, and maintained, in positions 330 and 340, respectively as will also be explained.

Thus, to produce a left-to-right movement of shaft 110, actuator 100 operates as follows: first, membranes 112 and 116 are substantially simultaneously deflected to positions 330 and 340, respectively. This creates an area of relatively high pressure immediately to the right of membrane 116 and an area of relatively low pressure immediately to the left of membrane 112, as shown in FIG. 3. This also causes a $\Delta V$ (a single, non-repeated, relatively small amount) of fluid, as indicated in FIG. 3, to enter chamber 104. This entrance of fluid into chamber 104 increases the pressure therein, thereby pressuring the divider portion of shaft 110, and forcing a $\Delta V$ of fluid to exit from chamber 102 to compensate for the added $\Delta V$ fluid in chamber 104. The fluid exits from chamber 102 to pass through valve 121 in order to counteract the relative reduction in pressure immediately to the left of membrane 112 created by deflection of membrane 112 to position 330. Thereafter, membranes 112 and 116 are maintained in deflected positions 330 and 340.

Once membranes 112 and 116 are fixed in deflected positions 330 and 340, substantially simultaneous, in-phase, pulsing of membranes 114 and 118 to positions 310 and 320, respectively, and then pulsing of membranes 114 and 118 back to their original positions, produces left-to-right movement of shaft 110. Each pulse of each membranes causes fluid to flow out of chamber 104 and into chamber 102 by the principles described with reference to FIG. 1 above, and indicated by arrows on FIG. 3. The double arrows exiting chamber 104 and entering chamber 102 indicate that when the membranes are pulsed in-phase, a "double" amount of fluid is pumped from chamber 104 to chamber 102.

It should be noted that for membrane 118 to force fluid into chamber 102, it must be de-energized. The de-energization of membrane 118 may not provide sufficient force to force fluid into chamber 102. This problem may be overcome in at least the following two ways.

Figure 3A:
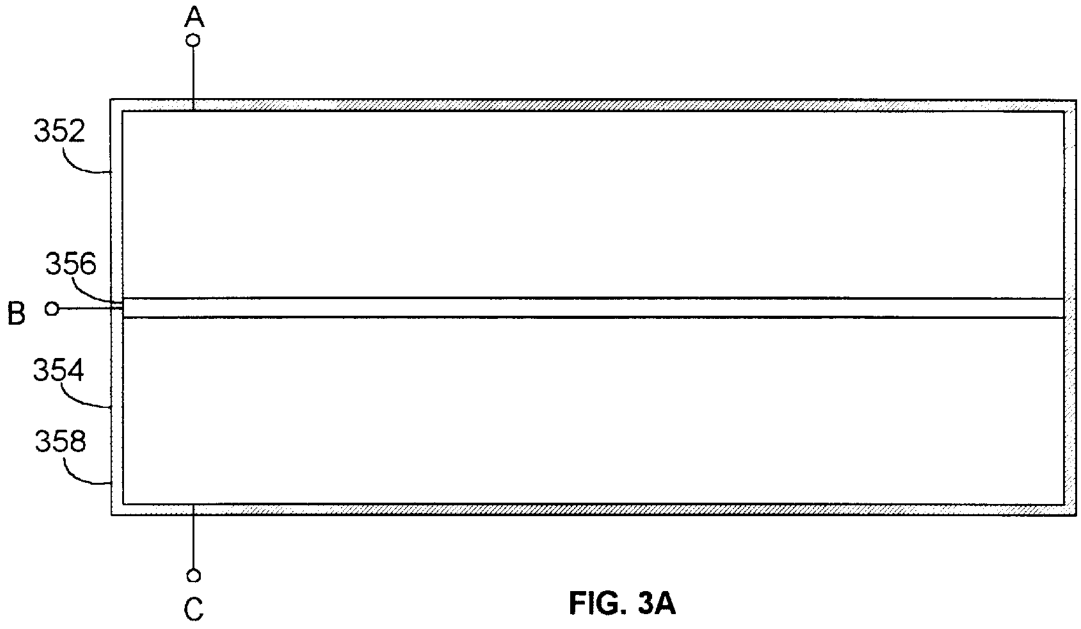
FIG. 3A shows a cross-sectional view of a piezoelectric bi-morph for use in a preferred embodiment of a hydraulic actuator according to the invention.

First, it should be noted that the membranes shown in FIGS. 1–7 may preferably be implemented using piezoelectric bi-morphs. FIG. 3A shows a cross-sectional view of a piezoelectric bi-morph 350. Bi-morph 350 is formed from oppositely-poled piezoelectric plates 352 and 354, which are bonded to a metal shim 356 for mechanical stiffness. FIG. 3A also shows an isolation coating 358 which preferably substantially prevents the membranes from contacting the hydraulic fluid. Coating 358 is preferably penetrated by the wires.

A voltage differential may be applied to the electrical contacts A,B and C. Applying a voltage differential across bi-morph 350, e.g., raising plate 352 to a high voltage and dropping plate 354 to a low voltage, produces opposing motion in the plates and, therefore, causes deflection of bi-morph 350 in a first direction. Applying an opposite voltage differential across bi-morph 350 causes deflection of bi-morph 350 in an opposite direction. Thus, applying a first voltage differential across bi-morph 350 in a first direction and then applying a reverse voltage differential across bi-morph 350 creates two equally powerful, yet directionally opposite, bi-morph strokes, as required by the invention. One preferable size of the bi-morph in this particular application is 3.8 centimeters×7.6 centimeters with a thickness of 1.0 millimeters.

Second, a spring (not shown) could be placed behind membrane 118. In this embodiment, the spring is biased toward the de-energized position with enough force such that, at the end of the de-energization stroke, the spring delivers the required pressure to force fluid into chamber 102. It follows that, in this particular embodiment, the process of energizing membrane 118 should overcome the bias of the spring.

Third, membrane 118 could be formed from a suitable stiff material. This preferably obviates the need for a spring to provide additional force during the de-energization stroke.

Figure 4:
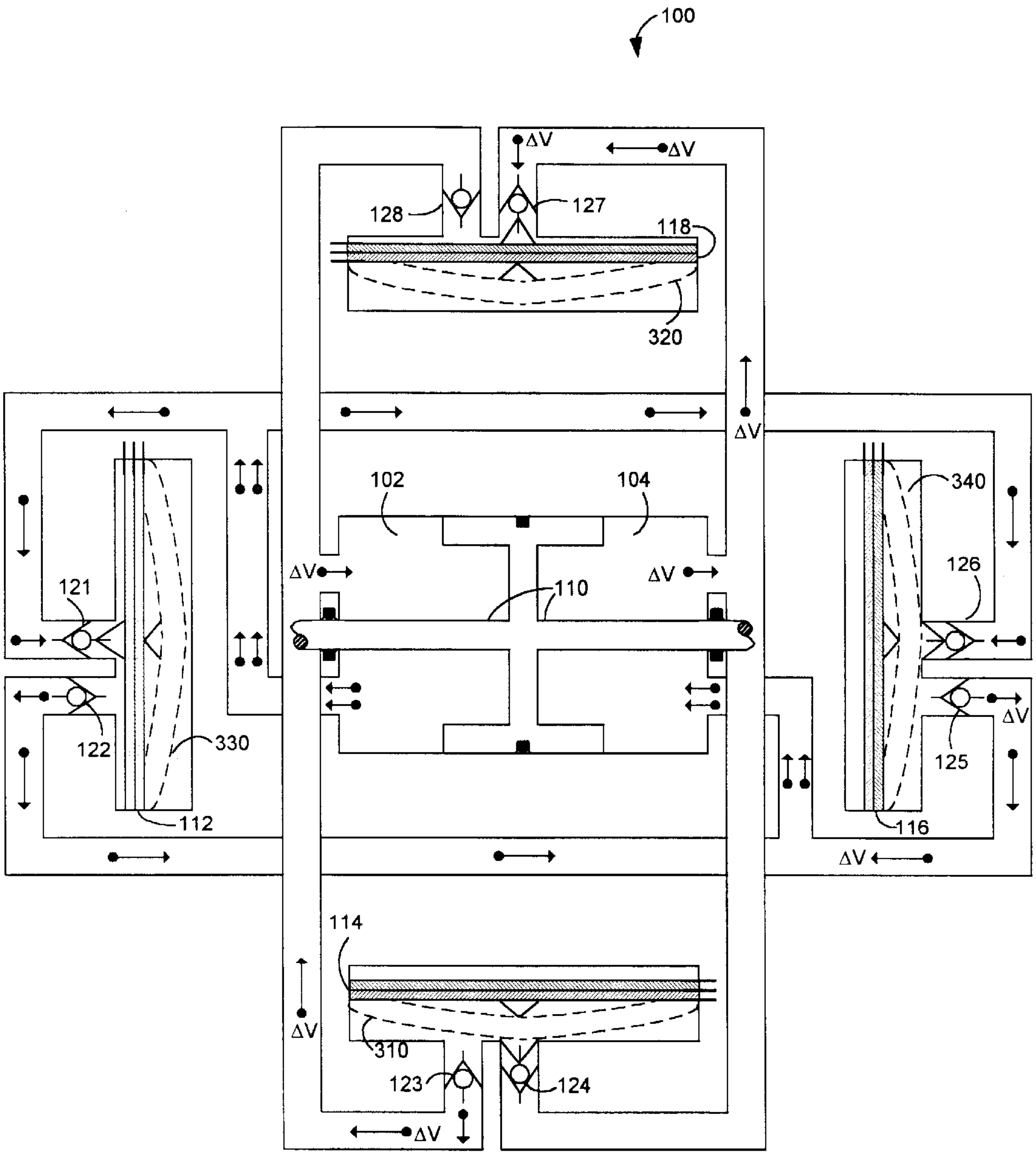
FIG. 4 is a schematic diagram of the actuator in FIGS. 1–3 causing a right-to-left actuator shaft movement.

FIG. 4 illustrates the operation of actuator 100 when the membranes are deflected to produce a right-to-left movement of shaft 110. Right-to-left movement of shaft 110 requires the flow of fluid into chamber 104 and the removal of fluid from chamber 102. This movement is implemented similarly to the implementation of left-to-right movement described with respect to FIG. 3. However, in the right-to-left movement, membranes 114 and 118 are pre-positioned to positions 310 and 320, respectively, and membranes 112 and 116 are pulsed in-phase to positions 330 and 340, respectively.

It should be noted that membranes 114 and 116 in FIGS. 1–4 are fixedly positioned at a pre-determined distance from the openings that lead to the valves. This distance allows for the de-energized free condition described herein. However, in an alternative embodiment of the invention described with reference to FIGS. 1–4, it is possible to fixedly position membranes 114 and 116 substantially immediately adjacent the openings that lead to the valves, similar to what is shown for membranes 112 and 118. In this embodiment, the de-energized free condition requires that membranes 114 and 116 are deflected. Thus, for this embodiment, some electrical current is required for the deflection of membranes 114 and 116.

Figure 5:
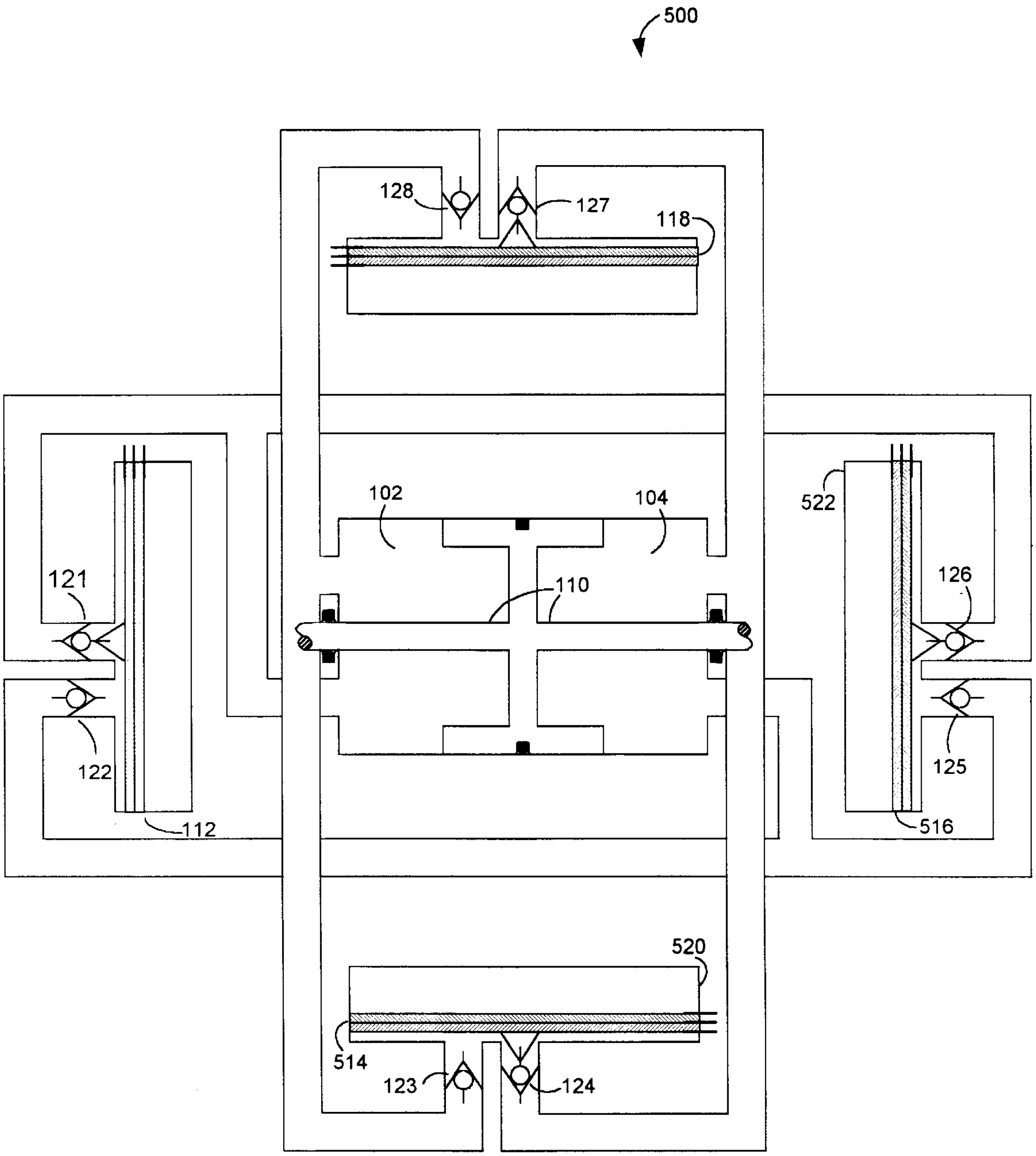
FIG. 5 is a schematic diagram of a preferred embodiment of a de-energized fixed hydraulic actuator according to the invention.

FIG. 5 illustrates another embodiment of the invention that, unlike the embodiment shown in FIGS. 2–4, is de-energized fixed—i.e., actuator 500 fixes shaft 110 in a particular position when actuator 500 is de-energized and is therefore not able to actuate shaft 110.

Actuator 500 is identical to actuator 100 shown in FIGS. 1–4 with the exception of the positioning of membranes 514 and 516 within membrane chambers 520 and 522. In FIGS. 1–4, membranes 114 and 116 are positioned at some distance from the entrance to the tubes leaving the membrane chamber. Membranes 514 and 516 shown in FIG. 5, however, are positioned substantially immediately adjacent the tubes leaving their respective membrane chambers. This positioning of membranes 514 and 516 results in the de-energized fixed feature of actuator 500 because, unlike in actuator 100, no fluid may flow in or out of chambers 102 and 104 when each of the membranes is at rest—i.e., not deflected. Therefore, in a de-energized state, when each of the membranes is at rest, the divider of shaft 110, and is, therefore, the shaft itself, cannot be moved in either direction because the fluid in chambers 102 and 104 has nowhere to flow.

Figure 6:
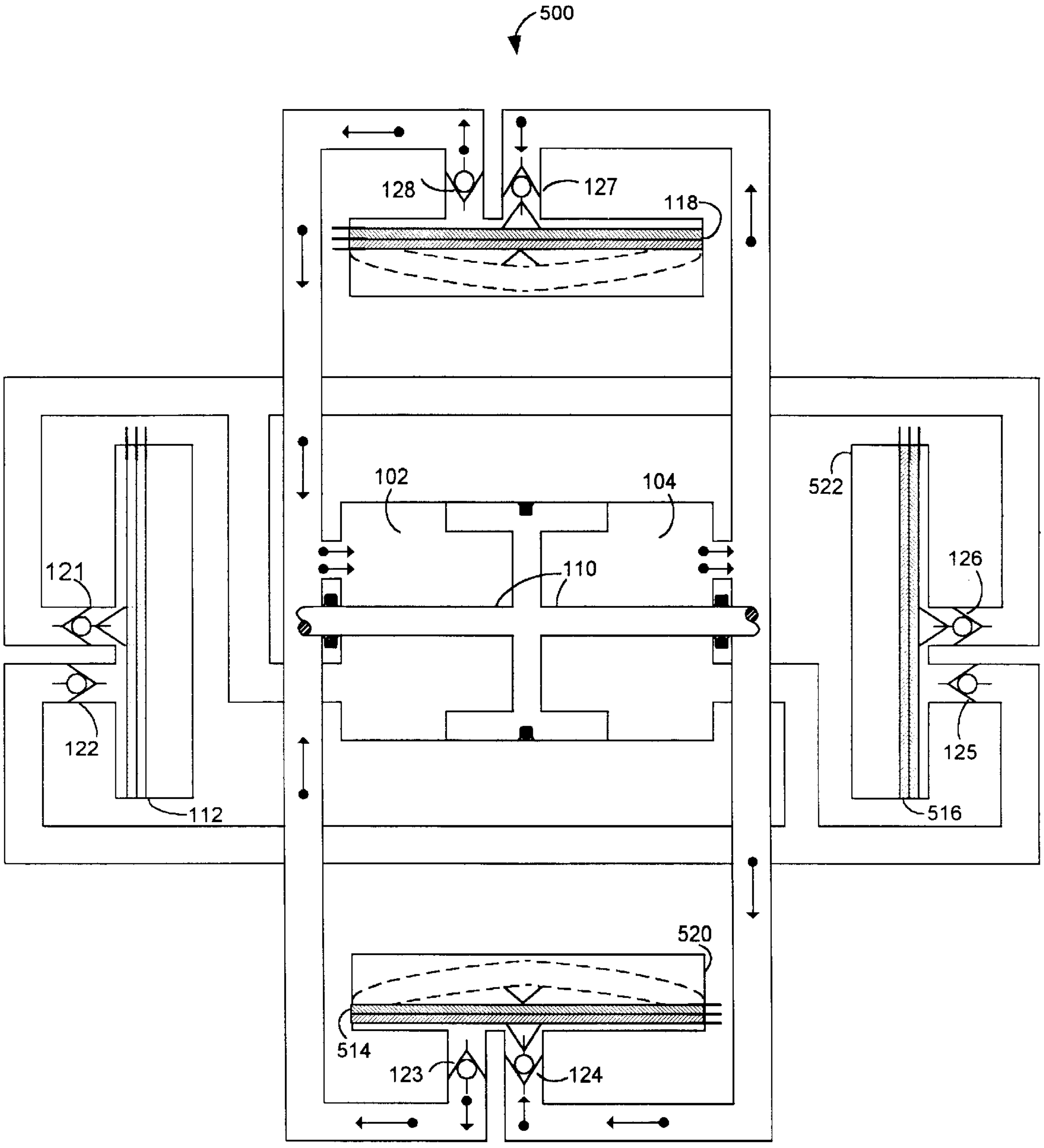
FIG. 6 is a schematic diagram of the actuator in FIG. 5 left-to-right actuator shaft movement.

FIG. 6 shows the movement of the fluid and membranes required for causing a left-to-right movement of shaft 110. In this case, one of membranes 118 or 514 should preferably be pre-positioned in a deflected state. Thereafter, to create the left-to-right motion of shaft 110, the membranes should be continually pulsed such that the non-deflected membrane of membranes 118 and 514 should be deflected while the other is returned to its rest position. When membranes 118 and 514 are continually deflected out-of-phase with one another—i.e., one membrane is deflected while the other is at rest—shaft 110 is moved in a left-to-right motion according to the principles described above with respect to FIG. 1.

The pre-positioning of one of membranes 118 and 514 can be accomplished using an accumulator or other suitable device that is actively valved to one of the membrane areas. This accumulator introduces additional fluid to the system at the location in the system where the fluid is required, to deflect at least one of the membranes during the pre-positioning stage. In one embodiment, a single accumulator can be actively valved to provide extra fluid to any desired portion of the actuator.

Figure 7:
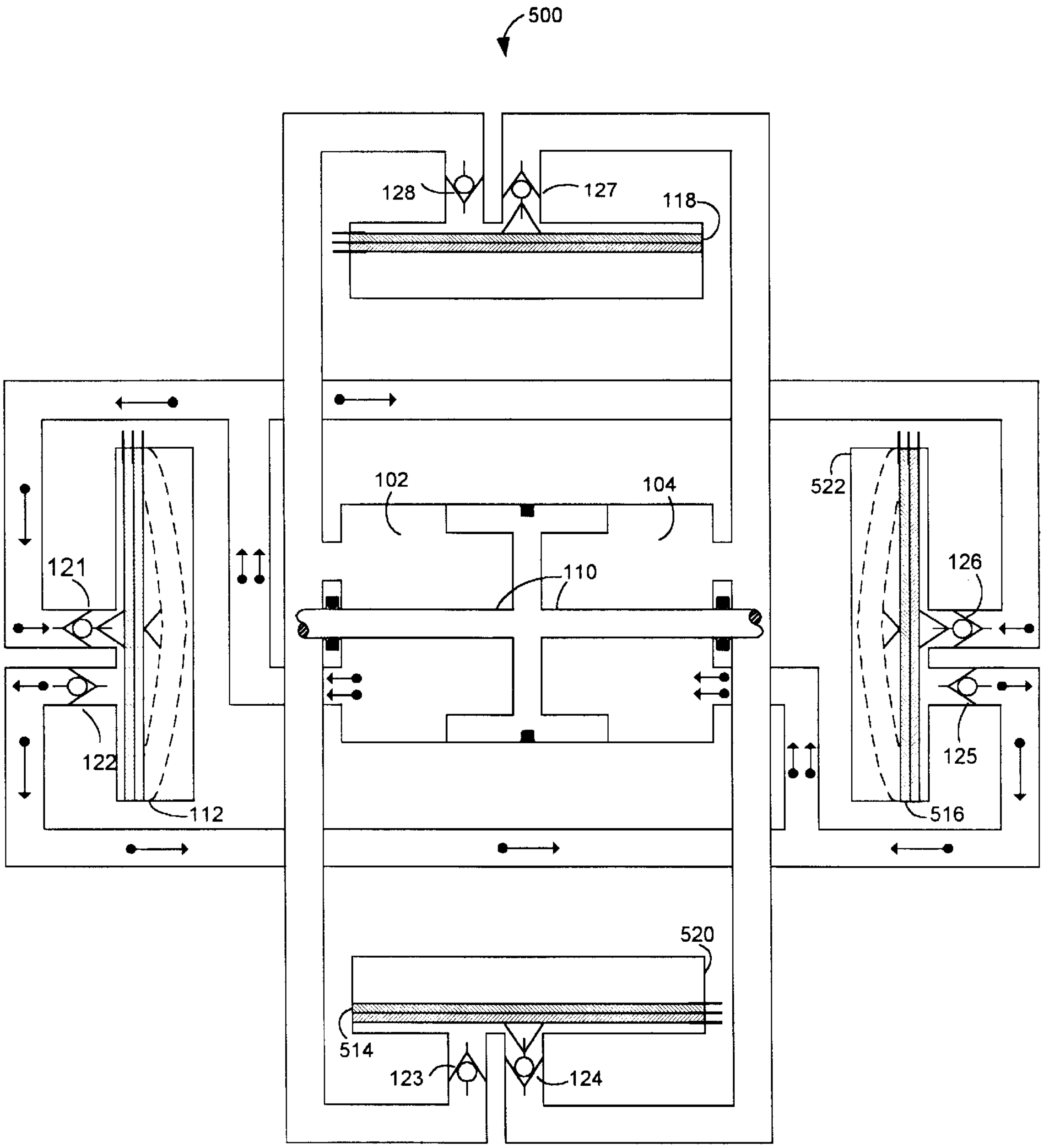
FIG. 7 is a schematic diagram of the actuator in FIGS. 5 and 6 causing a right-to-left actuator shaft movement.

FIG. 7 shows the movement of the fluid and membranes required for causing a right-to-left movement of shaft 110. In this case, one of membranes 112 or 516 should preferably be pre-positioned in a deflected state. Thereafter, to create the right-to-left motion of shaft 110, the membranes should be continually pulsed such that the non-deflected membrane of membranes 112 and 516 should be deflected while the other is returned to its rest position. When membranes 112 and 516 are pulsed out-of-phase with one another, shaft 110 is moved in a right-to-left motion according to the principles described above with respect to FIG. 1.

The pre-positioning of one of membranes 112 and 516 should preferably be accomplished in the same fashion as the pre-positioning of membranes 118 and 514 is accomplished.

Figure 8:
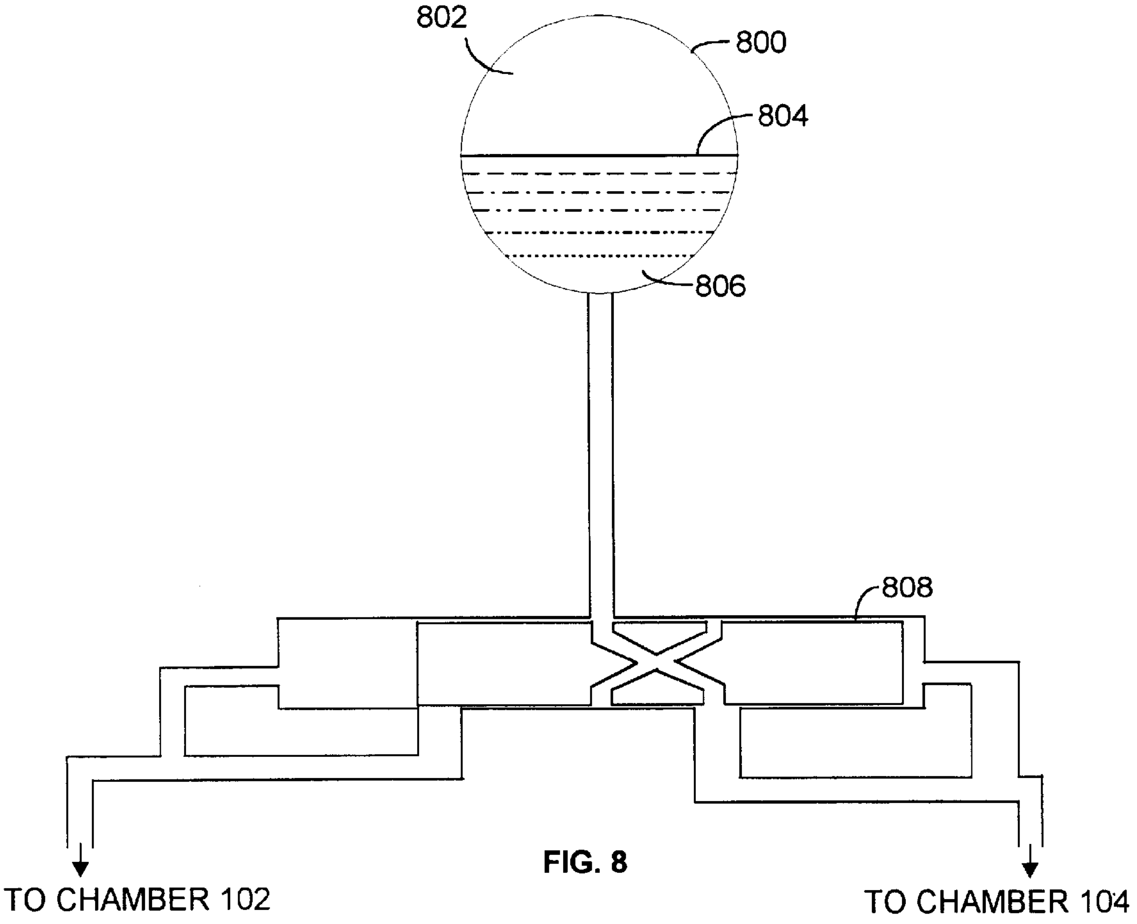
FIG. 8 is a schematic diagram of an accumulator system according to the invention.

It should be noted that an accumulator may be used in the system for a more general purpose than the purpose described above with respect to FIG. 6. For example, all practical hydraulic systems should preferably have provision for expansion and contraction of the fluid in the system. FIG. 8 shows an embodiment of an accumulator 800 that may be connected to the system to satisfy this particular purpose.

Accumulator 800 preferably includes nitrogen 802, a diaphragm 806, hydraulic fluid 808 and shuttle valve 810. Shuttle valve 810 preferably senses which chamber has the higher pressure, and connects the other chamber to accumulator 800.

Accumulator 800 preferably is connected to chambers 102 and 104 and operates as follows. If pressure—e.g., pressure due to the expansion and contraction of the fluid which is not compensated for by the operation of the membranes—in chamber 102 is higher than pressure in chamber 104, shuttle valve 810 moves to the right, connecting chamber 104 to accumulator 800. If pressure in chamber 104 is higher than pressure in chamber 102, shuttle valve 810 moves to the left, connecting chamber 102 to accumulator 800. Thus, the operation of the accumulator is passive and based on the pressure in chambers 102 and 104.

Figure 9:
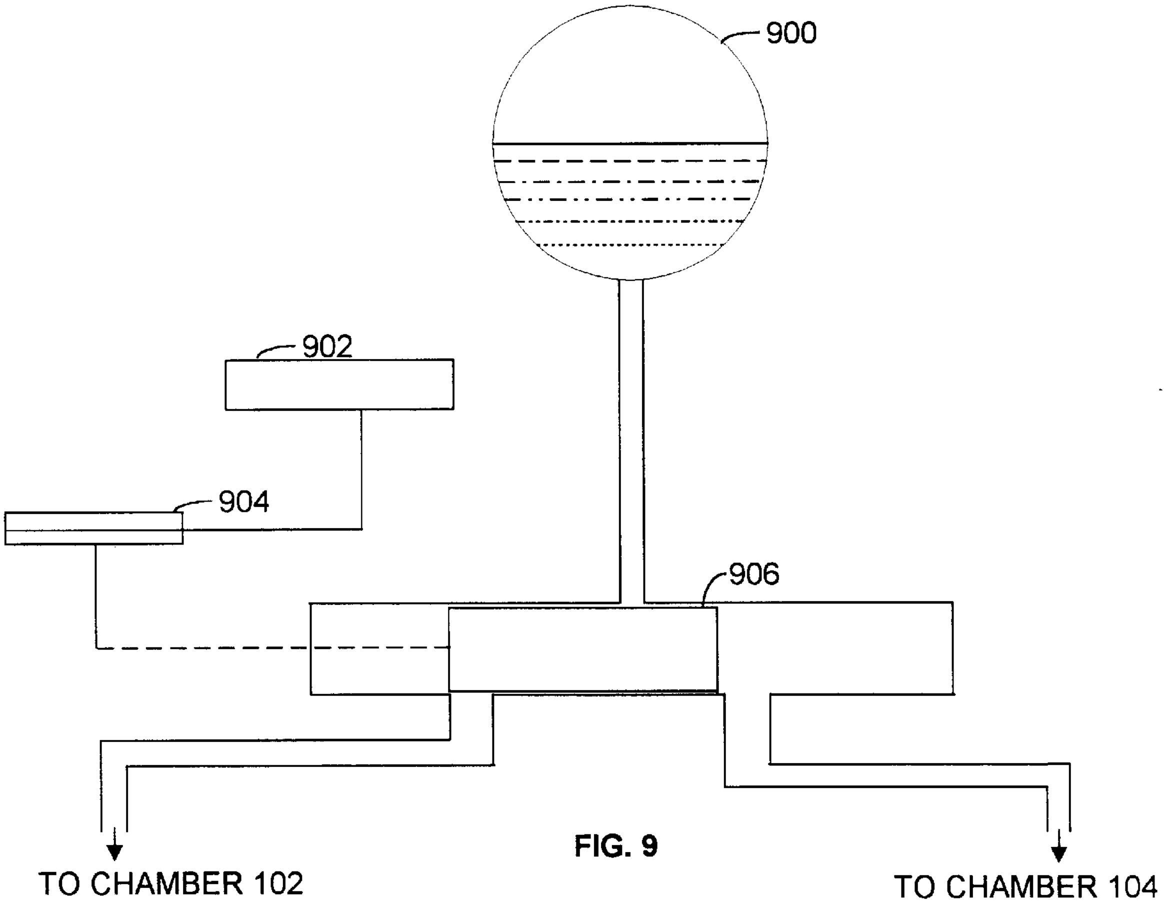
FIG. 9 is a schematic diagram of an alternative embodiment of an accumulator system according to the invention.

FIG. 9 shows an alternative embodiment of an accumulator wherein accumulator 900 is actively controlled by controller 902 and bi-morph membrane 904. A multiplier and suitable linkage mechanism may be implemented to utilize the motion of membrane 904 to actively guide shuttle 906.

Figure 10:
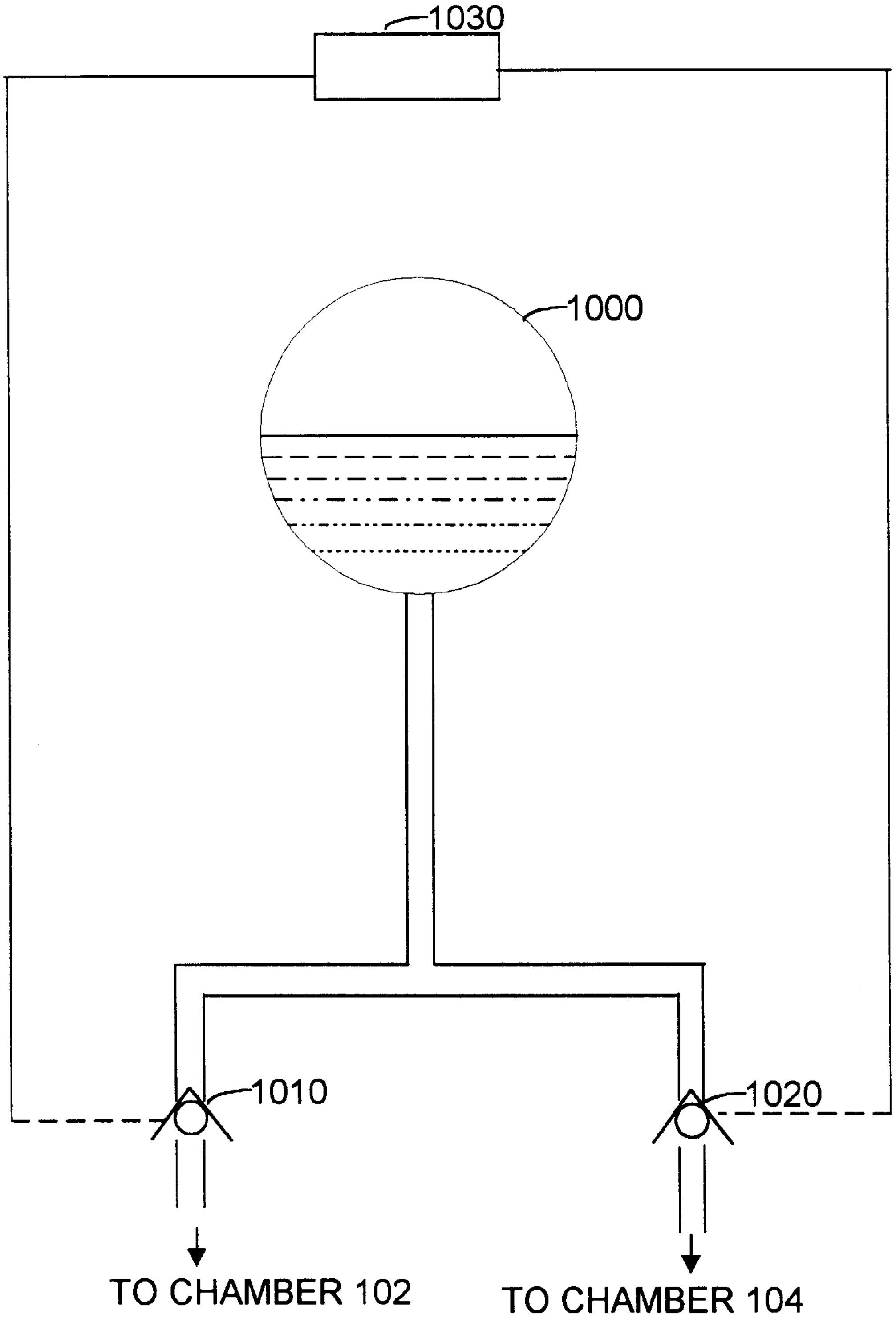
FIG. 10 is a schematic diagram of another alternative embodiment of an accumulator system according to the invention.

FIG. 10 shows yet another alternative embodiment of a system that controls accumulator 1000 with controller 1030. Controller 1030 utilizes active, valves 1010 and 1020, which may preferably be implemented using bi-morph membranes and similar motion-amplifying mechanisms as described above with respect to FIG. 9, to control the operation of accumulator 1000.

Each of the membranes may preferably be formed from piezoelectric material which is deflectable using an electrical signal. In an alternative embodiment, each of the membranes may be formed from a material that is deflectable using a magnetostrictive field. Or, alternatively, each of the membranes may be formed from a material which is mechanically deflectable. In each of these embodiments, the underlying principles of the invention are maintained as described above with respect to FIGS. 1–10.

Thus, a hydraulic actuator that is capable of substantial actuation but does not require a conventional pump, uses only passive valves, or, at most, a minimum of active valves, and, under certain circumstances, may be free to move, when the actuator is de-energized, is provided. Persons skilled in the art will appreciate that the present invention can be practiced by other than the described embodiments, which are presented for purposes of illustration rather than of limitation, and the present invention is limited only by the claims which follow.

What is claimed is:

1. A hydraulic actuator for actuating a shaft, the actuator comprising:

a first chamber;

a second chamber adjacent to said first chamber, a divider portion of said shaft being disposed therebetween and that seals said first chamber from said second chamber such that when fluid flows from one of said first chamber to said second chamber and said second chamber to said first chamber, said shaft is actuated;

a plurality of tubes for allowing fluid to flow between the first chamber and the second chamber;

a plurality of deflectable membranes for causing said fluid to flow; and a plurality of passive valves for directing a flow of said fluid in said actuator.

2. The actuator of claim 1, wherein said actuator is de-energized free.

3. The actuator of claim 1, wherein said actuator is de-energized fixed, and said actuator further comprises at least one active valve and an accumulator.

4. The actuator of claim 1, wherein said passive valves allow unidirectional fluid flow.

5. The actuator of claim 1, wherein each of said membranes comprises an obturator for further directing said flow of fluid.

6. The actuator of claim 1, wherein each of said membranes are deflectable using an electrical signal.

7. The actuator of claim 1, wherein each of said membranes are deflectable using a magnetostrictive field.

8. The actuator of claim 1, wherein each of said membranes is mechanically deflectable.

9. The actuator of claim 1 further comprising an accumulator coupled by active valves to the tubes.

10. The actuator of claim 1 further comprising an accumulator coupled by passive valves to the tubes.

11. A method of actuating a shaft using an actuator, said actuator including fluid, said method comprising:

pre-positioning a first plurality of deflectable membranes in said actuator; and deflecting a second plurality of deflectable membranes in order to move said fluid such that said movement of said fluid causes said shaft to move.

12. The method of claim 11, said deflecting comprising deflecting said membranes piezoelectrically.

13. The method of claim 11, said deflecting comprising deflecting said membranes magnetostrictively.

14. The method of claim 11, said deflecting comprising deflecting said membranes mechanically.

15. The method of claim 11, said deflecting comprising guiding said fluid in said actuator using passive valves.

16. The method of claim 11, further comprising allowing said shaft to respond to an external force when said membranes are in a non-deflectable state.

17. The method of claim 11, further comprising compensating for expansion and contraction of the fluid using an accumulator.

* * * * *